United States Patent [19]

Berg et al.

[11] Patent Number: 4,829,784
[45] Date of Patent: May 16, 1989

[54] METHOD AND SYSTEM FOR STORING INERT GAS FOR ELECTRIC IMPULSE SPACE DRIVES

[75] Inventors: Hans-Peter Berg, Mintraching; Helmut Bassner, Munich, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 184,150

[22] Filed: Apr. 21, 1988

[30] Foreign Application Priority Data

Apr. 30, 1987 [DE] Fed. Rep. of Germany ....... 3714424

[51] Int. Cl.$^4$ .............................................. F25B 1/00
[52] U.S. Cl. ......................................... 62/467; 62/7; 62/45.1; 62/264
[58] Field of Search .................. 62/7, 45, 264, 514 R, 62/467

[56] References Cited

U.S. PATENT DOCUMENTS

| | | | |
|---|---|---|---|
| 3,147,593 | 9/1964 | Garrett | 62/7 |
| 3,310,102 | 3/1967 | Trombe | 62/467 |
| 4,386,309 | 5/1983 | Peschka | 62/45 |
| 4,507,941 | 4/1985 | Lester et al. | 62/467 |
| 4,624,113 | 11/1986 | Hull et al. | 62/467 |

FOREIGN PATENT DOCUMENTS 2320245 11/1973 Fed. Rep. of Germany .

Primary Examiner—Ronald Capossela
Attorney, Agent, or Firm—W. G. Fasse; D. H. Kane, Jr.

[57] ABSTRACT

In a method and system for storing gas, especially an inert gas for electric impulse space drives which use inert gas as a reaction mass, the inert gas is filled into a storage tank in the gaseous and/or liquid state and is then cooled to solidify it into the solid state in which it is then stored. While in the earth's atmosphere, temperature regulation is achieved by means of thermal insulation of the tank and a convective heat exchange between a cryogenic coolant and the inert gas in the tank. While in the vacuum of space, temperature regulation is achieved by means of radiant heat exchange between the tank and deep space. For extracting the gas from the tank, the frozen gas is locally sublimated from the solid to the gaseous state by a controlled localized heat application, whereby the required gas pressure is developed for withdrawing gas from the tank which holds the gas in the solid state, except at a heated outlet area.

15 Claims, 1 Drawing Sheet

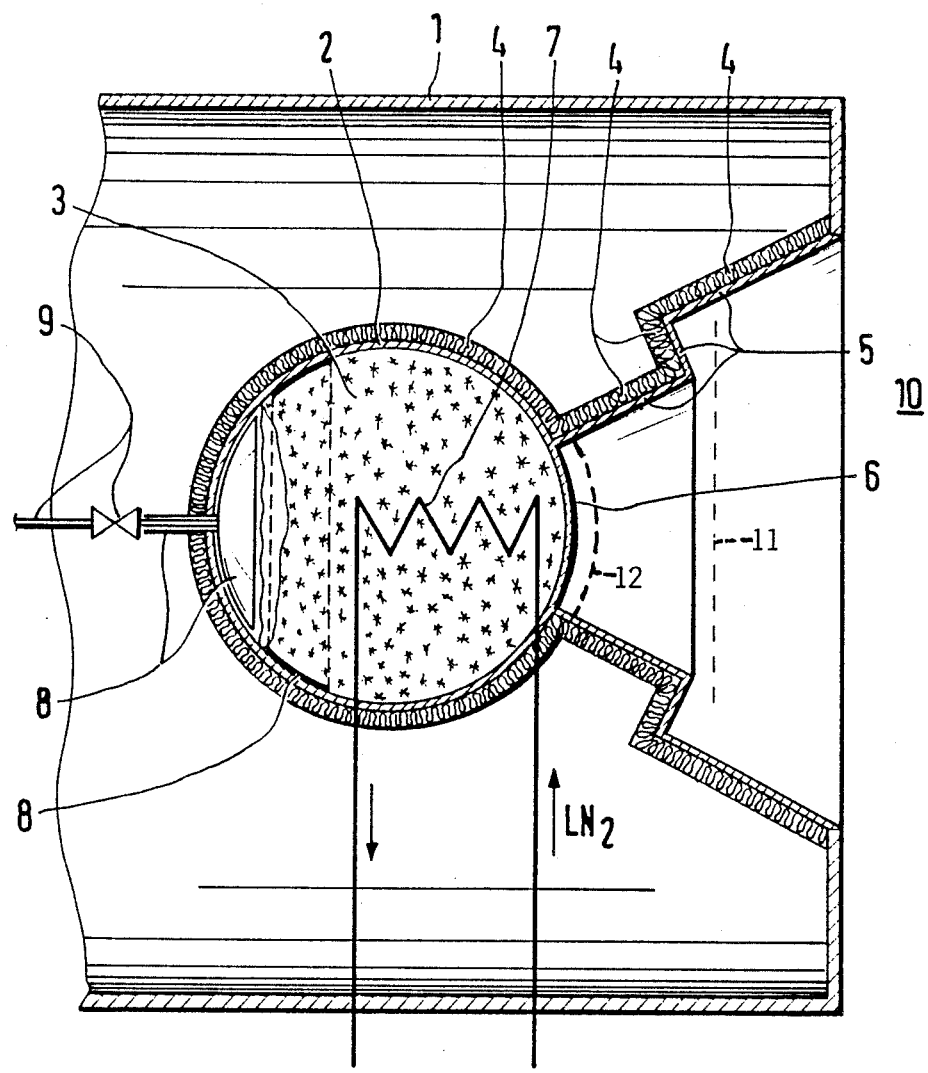

METHOD AND SYSTEM FOR STORING INERT GAS FOR ELECTRIC IMPULSE SPACE DRIVES

FIELD OF THE INVENTION

The invention relates to a method of operating a tank system of an electric impulse space drive which uses an inert or noble gas, preferably xenon for example, to provide a reaction mass or thrust source. The invention further relates to a tank system for carrying out the present method.

DESCRIPTION OF THE PRIOR ART

It is customary to store the fuel or propellant or the propellant components in liquid form for standard chemical space drives, such as normal rocket engines. Even for propellants which are gaseous under normal conditions, such as oxygen and hydrogen for example, the propellants are preferably carried in the spacecraft in the liquid state (e.g., LOX, and $LH_2$). For a given tank volume, a significantly greater mass of propellant can be stored in the liquid state because of the increased density relative to the gaseous state. Before the launch, such propellants are held in the liquid state by means of undercooling. However, in the spacecraft, especially after launch, because of insufficient cooling or lacking thermal insulation of the storage tanks, the propellants are usually held in the liquid state by storing the propellants at a pressure which is at least as great as the momentary respective vapor pressure of the propellant. In order to maintain such an elevated pressure, the structure of the propellant tanks must be relatively sturdy and therefore relatively heavy. It is also possible to allow a certain controlled quantity rate of propellant to vaporize, in order to control or stabilize the temperature of the remaining liquid propellant by means of the associated vaporization energy. However, such controlled vapor releases clearly represent storage losses, or rather, fuel losses.

Furthermore, in such a prior system, both liquid and gas phases exist simultaneously in the tank. Under the weightless conditions of space, separating the two phases becomes problematic. It must be ensured that only the desired phase is extracted; otherwise uncontrolled thrust variations or even failure of the engine may result. This problem is addressed in German Patent Publication (DE-PS) No. 2,320,245.

There are missions to be carried out in weightless space which require the engines to develop only relatively small thrust forces, but extremely high jet speed or stream velocities up to approximately 40 km/s, and a long thrust duration or service life up to several years. Asteroid and comet probes represent examples of spacecraft having such engine requirements. Electric engines or impulse drives also known as ion engines are especially provided for such applications. In these impulse drives an inert or noble gas, preferably xenon, or instead mercury vapor is ionized in a high frequency field of an electric coil, for example, and is then accelerated or decelerated in an electrostatic field of several consecutively arranged grid electrodes in order to produce a reaction force thrust. In contrast to chemical propellants, which provide both the mass and the energy for producing a momentum impulse or thrust, the inert or other gas used in electric impulse drives only provides the support or reaction mass, that is the carrier for the momentum impulse or thrust. The impulse energy is applied by the ionizing coil and the grid electrodes. The electric energy for producing the impulse may be generated by a nuclear electric cell or by photovoltaic solar cells. When mercury is used as the reaction mass, it is stored in the liquid state and delivered from the tank under the effect of a pressurizing gas. When an inert gas such as xenon or argon is used as the reaction mass, it should be stored at a greatest possible density in the gaseous state, or even better in the liquid state. However, as a result in prior systems, the same problems arise as in the standard known chemical propellant storage systems, for example for LOX and $LH_2$. Namely, the high storage pressure required at atmospheric temperatures necessitates a sturdy and heavy tank structure. Furthermore, problems may arise with separating the gas and liquid phases under weightless conditions.

OBJECTS OF THE INVENTION

In view of the foregoing it is the aim of the invention to achieve the following objects singly or in combination:

to provide a method for easily and safely filling, storing and extracting inert gas for an electric impulse space drive;

to provide a tank system for carrying out the above method, whereby the mechanical loading of the tank is low so that it may be of a light weight and inexpensive construction;

to achieve effective phase separation in this method and tank system, so that only the desired gaseous phase is extracted from the tank;

to construct the tank so as to require minimal thermal insulation while maintaining cryogenic storage temperatures so that a high storage pressure is not required; and to reduce or eliminate storage losses from such a tank system by providing effective cooling which does not require controlled vaporization and vapor release for cooling.

SUMMARY OF THE INVENTION

The above objects have been achieved according to the method of the invention in which the inert gas which is to be used as a reaction mass for an electric impulse space drive is filled into a storage tank in a gaseous and/or liquid state. Thus, both gas and liquid phases may be in the tank. The inert gas is then cooled to be frozen into the solid state, in which state the inert gas is stored in the tank. In the earth's atmosphere, temperature control is achieved essentially by means of thermal insulation of the tank and convective heat exchange with a cryogenic coolant, such as liquid nitrogen, within the tank. In the vacuum of space, temperature control is achieved essentially by means of radiant heat exchange with the empty space. In order to be extracted from the tank, the inert gas is locally sublimated to the gaseous state, whereby the required gas pressure is developed by a controlled application of heat to the gas extraction or outlet area.

A tank system according to the invention, for carrying out the method, essentially includes a thermally insulated tank having an exposed radiator surface which may, however, be selectively covered or thermally insulated relative to the environment of the spacecraft, a thermally insulated reflector dish or screen extending from the radiator surface to the outer skin of the spacecraft, a cooling heat exchanger arranged within the tank, a gas extraction system arranged at least approximately opposite the radiator surface, and a heating element arranged near the gas extraction system. The system may further include a thermally reflecting shutter body adjustably arranged in the field of view of the radiator surface. The radiator surface may be an opening at the tank.

According to the invention, the inert gas is stored in the solid state, whereby only minimal pressure loading is applied to the tank. Therefore, relatively thin-walled, lightweight tank structures are possible. The freezing temperature for solidifying xenon, for example, lies between −112° and −150° C. at pressures below 1 bar. In order to achieve and maintain the solid state under external atmospheric conditions, a certain expenditure of energy and structural measures is required. The tank must be thermally insulated as well as possible. Furthermore, a cryogenic coolant, such as liquid nitrogen for example, is required. However, the time spent in the earth's atmosphere is almost negligibly small compared to the entire mission or flight duration of several years. In comparison, in the cold vacuum of space at −269° C., maintaining the solid state of the reaction mass inert gas is no problem at all, and may easily be achieved by radiant thermal exchange with the surrounding space. For extracting the inert gas, the frozen solid phase is directly converted to the gaseous phase through local sublimation, whereby a reliable phase separation is ensured even in weightless conditions of space. In order that the heating power which must be expended for achieving the local sublimation remains small, the inert gas is only cooled to slightly below its sublimation temperature for storage in the solid state. Because the use of the inert gas as the reaction mass for electric or ion engines or space drives is very small with respect to time, that is to say the consumption or expulsion rate is small, in the range of a few mg/s, the sublimation extraction process can proceed very slowly, whereby the required heating power is further reduced.

BRIEF DESCRIPTION OF THE DRAWING

In order that the invention may be clearly understood, it will now be described, by way of example, with reference to the accompanying drawing, wherein the single figure schematically shows all the essential elements of a tank system according to the invention for performing the present method.

DETAILED DESCRIPTION OF PREFERRED EXAMPLE EMBODIMENTS AND OF THE BEST MODE OF THE INVENTION

In order to achieve advantageous mechanical characteristics in terms of stability and strength, and to enclose a large storage volume with the smallest possible thermally effective surface area, the tank 2 essentially has a spherical shape. The outer surface of the wall of the tank 2 is covered with a highly effective thermal insulation 4, which may function, for example, on the principle of so-called vacuum super insulation. A cooler 7 in the form of a heat exchanger is arranged in the interior of the tank 2. Whenever necessary for providing cooling, liquid nitrogen or other cryogenic coolant flows through the cooler 7. The cooler 7 is activated, that is to say cryogenic coolant flows through it, practically only during external atmospheric conditions, first for freezing the inert gas 3 during filling of the tank 2, and then for removing any heat which may enter the tank from the environment through the thermal leaks.

The arrangement shown in the Figure corresponds to the conditions in the vacuum of space. The tank 2 is filled to a large extent with solid frozen inert gas 3, preferably xenon for example, which is held at a temperature below −112° C. A radiator surface 6 of the tank 2 is open or exposed so that a radiative heat exchange is possible between the inert gas 3 in the tank 2 and the cold deep space 10 at −269° C. A stepped, mirrored reflector dish 5 extends from the radiator surface 6 to the outer skin of the spacecraft 1, and is coated on its back surface with a similar highly effective thermal insulation 4. The reflector dish 5 increases the view angle of the radiator surface 6 to the deep space cold background reflects away any incident thermal radiation coming from the surroundings, for example, from the spacecraft 1 itself, whereby the radiant cooling effect is improved. The external area of the radiator surface 6 of the tank 2 has a thermal radiation coefficient which is only approximately 10% less than that of a perfect black body.

In order that the temperature of the frozen inert gas 3 can be maintained at a precise defined value slightly below the sublimation temperature, it is advantageous to arrange a thermally reflecting body in the field of view of the radiator surface 6, as indicated by the dashed line 11 in the Figure so that the effective reflective surface of the body 11 is adjustable in a direction perpendicular to the radiation direction i.e. the axial direction of the reflecting dish 5. This body 11 could be in the form of a tiltable shutter, a louver shutter, or an iris camera shutter, for example, and could be arranged within the reflector dish 5. The shutter body 11 could easily be adjusted to control the rate of heat radiation from the tank 2. The radiator surface 6 is insulated by a removable or adjustable insulation while it is exposed to the earth's atmosphere. This removable insulation is merely indicated by a dashed line 12 in the Figure, because for the space operation shown, the insulation has been removed or retracted. The shutter 11 and removable insulation 12 may advantageously be combined into a single adjustable insulating and reflecting body.

Because the radiator surface 6 defines the coldest location of the tank 2 while the system operates in space, the outlet or gas extraction area is located diametrically opposite the radiator surface 6. The gas extraction system 9 includes gas pipelines, filters, valves, etc. and penetrates the insulation 4 at least at one point for attaching to the tank 2. The resultant hole or holes in the insulation layer 4 result in a heat leak to the tank 2, whereby sublimation of the inert gas 3 is enhanced in the gas extraction area. Additionally, heating elements 8 are provided in the gas extraction area to achieve a controlled local delivery of heat resulting in a controlled local sublimation. The gas extraction through sublimation results in a well-defined phase boundary between the solid and the gaseous material, which is indicated in the Figure by a crooked uneven line. Thus, it is ensured by the local temperature relationships that only the desired gas phase is extracted, even in the weightless conditions of space. Further, the pressure loading of the tank 2 is quite minimal, as the absolute vapor pressure of solid xenon at −112° C. is approximately 0.7 bar, while at −150° C. it is approximately 0.012 bar.

Although the invention has been described with reference to specific example embodiments, it will be appreciated, that it is intended to cover all modifications and equivalents within the scope of the appended claims.

What we claim is:

1. A method of operating a tank system for storing an inert gas, especially for electric impulse space drives using such an inert gas as a reaction mass or thrust source, comprising the following steps:
   (a) filling said inert gas into a storage tank;
   (b) cooling said inert gas in said tank to freeze said inert gas into a solid state for storing said inert gas in said solid state in said tank;
   (c) maintaining said solid state under external earth atmospheric conditions by thermally insulating said tank and by cooling said solid state gas in said tank by convective/radiative/conductive heat exchange with a cryogenic coolant;
   (d) maintaining said solid state under external space vacuum conditions by cooling said inert gas by radiative heat exchange with deep space; and
   (e) delivering controlled heat at a gas extraction area of said storage tank for locally sublimating said frozen solid gas from the solid state to the gaseous state to develop a required gas delivery pressure for extracting gas in the gaseous state from said tank.

2. The method of claim 1, wherein said inert gas is filled into said tank in a gaseous state.

3. The method of claim 1, wherein said inert gas is filled into said tnak in a liquid state.

4. The method of claim 1, wherein said inert gas is filled into said tank in a two-phase state including a liquid state component and a gaseous state component.

5. The method of claim 1, wherein said cryogenic coolant is liquid nitrogen.

6. The method of claim 1, wherein said cryogenic coolant is gaseous nitrogen.

7. The method of claim 1, wherein said cryogenic coolant is in a two-phase state including a liquid state component and a gaseous state component.

8. The method of claim 1, wherein said inert gas is xenon.

9. A tank system for storing an inert gas, especially for electric impulse space drives using said inert gas as a reaction mass or thrust source for propelling a spacecraft, comprising storage tank means for receiving said inert gas, thermal insulation essentially externally covering said storage tank means, a radiator surface forming part of said storage tank means, said radiator surface being free of said thermal insulation so as to be exposable to deep space, adjustably arrangeable insulating means for covering and insulating said radiator surface when required in the earth's atmosphere, a reflector dish extending from said radiator surface to an outer skin of said spacecraft, permanent thermal insulation covering a back surface of said reflector dish, at least one cooler means arranged within said storage tank means, at least one gas extraction means connected to said tank approximately opposite said radiator surface for extracting gas from said tank, and heating means operatively arranged near said gas extraction means for removing inert gas from said tank by sublimation from the solid phase.

10. The tank system of claim 9, comprising a thermally reflecting shutter body adjustably arranged in the field of view of said radiator surface for controlling thermal radiation from said radiator surface.

11. The tank system of claim 10, wherein said thermally reflecting shutter body is combined as an integral component with said adjustably arrangeable insulating means.

12. The tank system of claim 10, wherein said thermally reflecting shutter body comprises an adjustable louver shutter.

13. The tank system of claim 10, wherein said thermally reflecting shutter body comprises an adjustable iris diaphragm.

14. The tank system of claim 9, wherein said storage tank means has an essentially spherical shape.

15. The tank system of claim 9, wherein said reflector dish has a stepped, mirrored surface.

* * * * *